US008819020B2

(12) United States Patent
Jenkins et al.

(10) Patent No.: US 8,819,020 B2
(45) Date of Patent: Aug. 26, 2014

(54) CAREER CRIMINAL AND HABITUAL VIOLATOR (CCHV) INTELLIGENCE TOOL

(76) Inventors: Daniel Scott Jenkins, Denton, TX (US); Brandon Matthew Rana, Denton, TX (US)

( * ) Notice: Subject to any disclaimer, the term of this patent is extended or adjusted under 35 U.S.C. 154(b) by 127 days.

(21) Appl. No.: 13/458,280

(22) Filed: Apr. 27, 2012

(65) Prior Publication Data

US 2012/0278325 A1 Nov. 1, 2012

Related U.S. Application Data

(60) Provisional application No. 61/518,050, filed on Apr. 29, 2011.

(51) Int. Cl.
*G06F 17/00* (2006.01)
*G06F 7/00* (2006.01)

(52) U.S. Cl.
USPC ........... 707/737; 707/748; 705/317; 705/325; 705/38

(58) Field of Classification Search
None
See application file for complete search history.

(56) References Cited

U.S. PATENT DOCUMENTS

| | | | | |
|---|---|---|---|---|
| 5,781,704 | A * | 7/1998 | Rossmo | 706/45 |
| 2003/0120589 | A1* | 6/2003 | Williams et al. | 705/38 |
| 2005/0149567 | A1* | 7/2005 | Levin et al. | 707/104.1 |
| 2007/0013527 | A1* | 1/2007 | Sloan | 340/573.4 |
| 2007/0112713 | A1* | 5/2007 | Seaman et al. | 706/45 |
| 2008/0306750 | A1* | 12/2008 | Wunder et al. | 705/1 |
| 2009/0077070 | A1* | 3/2009 | DiFilippo | 707/5 |
| 2009/0106846 | A1* | 4/2009 | Dupray et al. | 726/26 |
| 2009/0327006 | A1* | 12/2009 | Hansan et al. | 705/7 |

* cited by examiner

*Primary Examiner* — Dung K Chau

(57) ABSTRACT

A computer implemented method, apparatus, and computer usable program product for ranking and categorizing criminal offenders in a jurisdiction. In one embodiment, external data associated with the offenders is processed in a set of data models to generate a ranking index of criminal offenders. The external data comprises offender data elements related to prior arrests. The computer software and web application enables officers, detectives, and supervisors to research the offenders in their jurisdiction. They can intentionally track and monitor the status of the offenders that are not currently incarcerated. They can deliberately increase lawful contacts with these high-rate and treacherous offenders.

1 Claim, 5 Drawing Sheets

| Offender ID | Offender | Offense | Offense Class | Offense Date | Points |
|---|---|---|---|---|---|
| 1 | John Doe | Burglary | Felony 2 | 1/12/2012 | 30 |
| 1 | John Doe | Burglary | Felony 2 | 2/15/2012 | 30 |
| 2 | Jim Smith | Arson | Felony 1 | 6/23/2010 | 40 |
| 3 | Dan Jones | Theft | Misdemeanor C | 5/14/2011 | 5 |
| 2 | Jim Smith | Theft | Misdemeanor C | 10/23/2011 | 5 |
| 4 | Randy Harris | Car Burglary | Misdemeanor A | 1/23/2012 | 15 |
| 2 | Jim Smith | Car Burglary | Misdemeanor A | 3/26/2012 | 15 |

FIG. 4

CAREER CRIMINAL AND HABITUAL VIOLATOR (CCHV) INTELLIGENCE TOOL

CROSS-REFERENCE TO RELATED APPLICATIONS

This application claims the benefit of provisional patent application Ser. No. 61/518,050, filed 2011 Apr. 29 by the present inventors.

BACKGROUND

Prior Art

The following is a tabulation of some prior art that presently appears relevant:

| U.S. Patents | | | |
|---|---|---|---|
| Pat. No. | Kind Code | Issue Date | Patentee |
| 20090077070 | A1 | 2009 Mar. 19 | DiFilippo |
| 20090248643 | A1 | 2009 Oct. 1 | Wasson |
| 20090307237 | A1 | 2009 Dec. 10 | Britton et al. |
| 20030115211 | A1 | 2003 Jun. 19 | Chen et al. |
| 5,781,704 | A1 | 1998 Jul. 14 | Rossmo |
| 20090125427 | A1 | 2009 May 14 | Atwood et al. |
| 20090089107 | A1 | 2009 Apr. 2 | Angell et al. |
| 20090198641 | A1 | 2009 Aug. 6 | Tortoriello |
| 20050267827 | A1 | 2005 Dec. 1 | Grant, Jr. et al. |

NONPATENT LITERATURE DOCUMENTS

Blumstein, A., Cohen, J., Roth, J., & Visher, c. 1986. Criminal Careers and Career Criminals. Washington, D.C.: National Academy Press.

DeLisi, M. 2001. Extreme Career Criminals. American Journal of Criminal Justice, 25, 239-252.

Tracy, P. E., Wolfgang, M. E., Figlio, R. M. 1990. Deliquency in a Birth Cohort II. Ann Arbor, Mi: Inter-University Consortium.

Wilson, J. Q., and Herrnstein, R. J., 1985. Crime and Human Nature. New York: Simon and Schuster.

Wolfgang, M. E., Figlio, R. M., & Sellin, T. 1972. Deliquency in a Birth Cohort. Chicago: University of Chicago Press.

Prior Art in the Field of Criminal Justice Databases

Prior art in the field of criminal justice includes database networks and research into crime and career criminals. A small percentage of people who regularly commit crime are responsible for a large percentage of crimes. Criminal justice research defines the high rate offenders as career criminals. Because they continue to offend after being arrested and receiving negative consequences repeatedly, researchers and criminal justice professionals recognize the need to deal effectively with these prolific criminals. Problems exist with current methods of determining the specific offenders who are the most habitual at all levels of law enforcement. No effective method exists to provide officers and prosecutors with a perspective of which offenders in a given jurisdiction are responsible for the most dangerous or heinous crimes as compared to all other offenders in a defined jurisdiction. The ability to identify the highest level offenders who commit most of the area's crime would be a significant advancement in law enforcement.

The empirical research consistently shows that fewer than ten percent of offenders are responsible for the majority of all crime. The seminal work conducted by Wolfgang (1972) demonstrated that a mere six percent of the criminal population were responsible for 52% of Philadelphia's crime. These career criminals were also responsible for 63% of the UCR index crimes, 71% of the homicides, 73% of the rapes, 69% of the aggravated assaults, and 82% of the robberies. (Wolfgang, 1972) A follow up study (Tracy 1990) found similar results; seven percent of career criminals were found to have committed 61% of all juvenile index crime, 60% of the homicides, 75% of the rapes, 65% of the aggravated assaults and 73% of the robberies.

Matt DeLisi's work defines an extreme career criminal as someone who has been convicted of murder, rape, or kidnapping, has over thirty arrests, and has been incarcerated in prison. (2001) Blumstein, Choen, Roth, and Visher published a classic study with the 1986 book *Criminal Careers and Career Criminals* in which they summarize that since rehabilitative efforts in the United States have not experienced any statistically significant accomplishment to date; the authors suggest incapacitation of the extreme career criminal. James Q. Wilson and Richard Herrnstein published a study in 1985 that concluded, "evil people exist and should be separated from the majority of citizens." The research suggests that if proper methods of identifying these chronic offenders can be established, the general public could greatly benefit by specifically targeting these individuals for increased law enforcement contact, enhanced sentencing, and incapacitation of these high-rate offenders.

Local, county, regional, state and Federal agencies possess databases with crime and offender details. The ability to extract and analyze an offender's information requires a law enforcement or prosecutor to request offender data singularly. Unfortunately, without an index which examines all offenders in a given jurisdiction, it is not possible to determine relevant seriousness or dangerousness in relation to other offenders. Fusion centers and intelligence sharing networks focus on aggregating crimes to determine which offenses are related or may have a common offender or combination committing the crimes. Agencies, fusion centers and current supporting software lack the tool necessary to determine the proportion of criminals responsible for committing most of the felony and misdemeanor level offenses.

Prior Art—Patents

The CCHV Intelligence Tool is unique regarding the set of features utilized to create an index of ranked offenders which enables multiple tiers of offenders to be grouped together. Prior art reveals previous patents with various component features or groups of features, but no other prior art combines these factors together in the same combination as the CCHV Intelligence Tool. The various features of the discussed prior art makes use of the features to accomplish tasks that are different from the CCHV Intelligence Tool which is to identify prolific offenders in a given jurisdiction. The features are listed below.

| Number | Feature |
|---|---|
| 1 | Factors are compiled in relation to a specified geographic area |
| 2 | Factors are ranked |
| 3 | Factors are compiled for individuals |
| 4 | Factor rankings are applied to the individuals |
| 5 | Individuals are ranked according to the factor ranking |
| 6 | Top two tiers of the individuals are grouped |
| 7 | The factors being law violations |
| 8 | The individuals being criminals |

DiFilippo, in U.S. Pat. No. 20090077070 (2009) creates an index utilizing six features in order to aid business in conducting criminal background investigations in order to prevent or reduce false negatives and false positives which could hinder a company from eliminating people from being considered for hiring or excluding people considered for hiring. DiFilippo does not relate the index to a specified geographic area or group the people into tiers.

Wasson, in U.S. Pat. No. 20090248643 (2009) creates a network-based system to aid in gathering crime offense data and determining who may have committed a specific crime. Wasson uses the three features related to specified geographic areas, factors being law violations, and individuals being criminals. Watson does not compile and rank factors for individuals, or use criminal data to identify career criminals. Watson does not group them into tiers.

Britton, in U.S. Pat. No. 20090307237 (2009) creates an index for ranking attorneys for display in a web based method for potential clients to aid in selecting the right attorney. Britton is utilizing four factors, but does not relate them to a geographic area, factor law violations by criminals, or rank the results into tiers.

Chen, in U.S. Pat. No. 20030115211 (2003) creates a computer program to display criminal law violations on a GIS based mapping feature in a specific geographic area. Chen's displays can be used to observe trends in specific crimes using crime analysis. Chen does not utilize ranking factors composed of criminal individuals, does not rank the individual offenders, and does not create tiers of career criminals.

Rossmo, in U.S. Pat. No. 5,781,704 (1998) creates a crime analysis tool to aid in determining the center or highest probability of a set of related crimes in a geographic area to aid investigators in determining the identity or residence of a criminal responsible for the set of crimes. Rossmo does not gather factors related to specific offenders to create an index, does not apply the factor ranking to the individual criminals or rank the criminals into tiers.

Atwood, in U.S. Pat. No. 20090125427 (2009) creates a system to aid in evaluating the risk of engaging in a financial transaction by examining a perspective person's FICO score and personal background. Atwood does not relate to a specific geographic area, does not include factors related to creating tiers of criminals based on their law violations.

Angell, in U.S. Pat. No. 20090089107 (2009) Angell creates a method to rank potential customers and their potential risk to a retail facility, but Angell does not relate to a specific geographic area, does not include factors related to creating tiers of criminals based on their law violations.

Tortoriello, in U.S. Pat. No. 20090198641 (2009) creates a method to forecast future crimes based on analysis of previous events. Tortoriello uses factors compiled in relation to a specified geographic area, ranks the factors that include law violations. Tortoriello does not compile factors for specific criminal individuals, rank these individuals or create tiers based on the grouped individuals.

Grant, in U.S. Pat. No. 20050267827 (2005) creates a method to evaluate risk of money laundering by a person or entity. Grant uses factors compiled in relation to a specified geographic area, ranks the factors and individuals, but does not factor criminals, law violations, or create tiers of criminals grouped together.

The CCHV Intelligence Tool provides street level officers, managers, and prosecutors with a general perspective of all known and reported crimes that have resulted in an arrest and charge of a perpetrator in relation to all other arrested persons in a given jurisdiction. The CCHV Intelligence Tool creates an index of ranked crimes and criminals responsible for those crimes with an interactive display. The officials with access to the CCHV Intelligence Tool quickly see the index listing of grouped offenders with hyperlinks to specific offender data for gathering intelligence on the criminals who produce abundant volumes of crime victims over the course of their criminal activities. Custom queries can be created to fit the needs of local, county, regional, state and even Federal level criminal justice needs.

SUMMARY OF PRIOR ART

A variety of disciplines utilize various aspects of ranking data sets, creating indexes in order to accomplish tasks. Though some prior art makes use of a few features, no single example makes use of the complete set of features in the CCHV Intelligence Tool. Law enforcement jurisdictions and agencies with responsibilities to detect crimes, and arrest and prosecute offenders, can benefit from learning who is responsible for the most dangerous and prolific criminals in their jurisdiction. Our career criminal and habitual offender index accomplishes this important task. One embodiment of our method and process is designed to identify a jurisdiction's top percent of offenders and place them into groups or tiers to be displayed through a computer program showing the current status of offenders in the top tiers.

Advantages of the CCHV Intelligence Tool

Various aspects of our CCHV Intelligence Tool may have one or more of the following advantages. All municipal, county, state and federal jurisdictions have record management systems to coordinate the collection, collation, storage, and reporting of data related to criminal offenses, criminal offenders, and the various victims, witnesses and associates related to the crimes. Private and public corporations also have record management systems based on servers that contain the data related to crime. Most jurisdictions have records management systems, data mining tools, and even fusion centers that aid in providing data regarding criminal offenders. In order to obtain this information, a law enforcement official must know some basic details regarding a criminal offender (name, gender, race, ethnicity, date of birth, social security number, driver's license number, etc.) prior to being able to access additional details regarding a known offender. The Federal and state level databases require law enforcement officials to have even more authority and knowledge of current illegal activities by an offender prior to accessing detailed records of an offender. The protections are important for law enforcement officials to follow. Police should not violate the law as they are working to enforce the law.

One embodiment of the CCHV Intelligence tool has many advantages to most record management systems, data mining tools and fusion center research products. The CCHV Intelligence Tool enables a law enforcement official to:

- learn the most dangerous and prolific offenders without knowing a specific criminal
- see the most active offenders who live in the district or area the officer works
- quickly observe the status of the offenders (incarcerated, out on bond, etc.)
- discover strategic threat group (prison gang) members released in the jurisdiction
- instantly see warning lights if an offender has engaged in dangerous offenses
- spot registered sex offenders and learn their type of victim preference
- research a criminal's offense reports from a single interface learn the local offenders who are draining a department's resources research an offender's method of operation see how the offender's appearance has been altered in the past put offenders in perspective regarding the frequency of their offences and, learn many other functional methods to locate these offenders.

Alternative Ways the Invention can Achieve its Result

Vary the value amounts of the category charges

Automatic status updates

Additional search options

Sort by district or grid specific to the agency

Additional status options

Use of drop down selection of query instead of query buttons

Offender crime locations are geocoded and show criminal areas of offending

Print options for screen shots or list of offenders

Export options or capability

License Plate search tool hyperlink

BRIEF DESCRIPTION OF THE DRAWINGS

FIG. 4 is a data sample used in analysis according to an aspect of the present invention.

Figure 1:
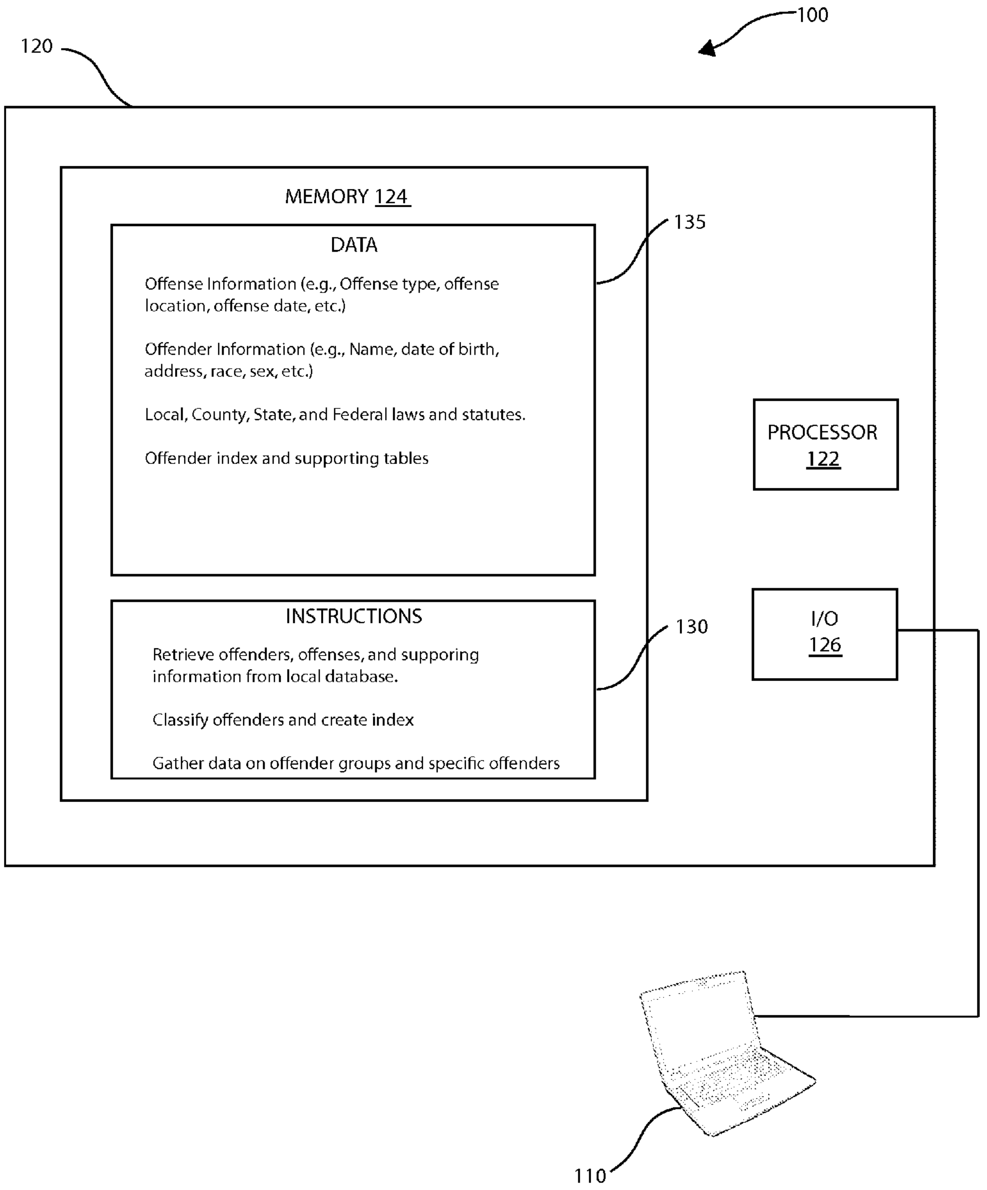
FIG. 1 is a system diagram according to an aspect of the invention.

| Drawings - Reference Numerals | |
|---|---|
| 100 | System |
| 120 | Server Computer |
| 122 | Processor |
| 124 | Memory |
| 126 | Input/Output (I/O) |
| 130 | Instructions |
| 125 | Data |
| 200 | CCHV Database |
| 210 | Miscellaneous Databases |
| 220 | Local Law Enforcement Databases |
| 230 | County Sheriff/Jail Databases |
| 240 | State/Federal Databases |
| 250 | Output |
| 300 | User Interface |
| 310 | Group Selection Variable |
| 322 | Offender Filters |
| 324 | Offender Index List |
| 325 | Offender Selection Variable |
| 330 | Offender Details |
| 500 | CCHV Index Creation Process |
| 510 | Criminal Offenses for a Jurisdiction |
| 520 | Rank Criminal Charges from Highest to Lowest |
| 530 | Classify Criminal Charges |
| 540 | Assign a Value for Each Classification |
| 550 | Obtain All Offender Charges from Databases |
| 560 | Apply Classifications to Charge Data for Each Offender |
| 570 | Sum Charge Values for Each Offender |
| 580 | Rank Offenders Based on Charge Value |
| 590 | Group Offenders Into Tiers by Predetermined Method |

DETAILED DESCRIPTION

As shown in FIG. 1, a system 100 in accordance with one aspect of the invention comprises a user input and display device, such as a client computer 110, connected to a server computer 120. In accordance with one embodiment of the invention, the computer 120 includes a processor 122, memory 124, an input/output (I/O) interface 126, and other components typically present in general purpose computers.

Memory 124 stores information accessible by processor 122, including instructions 130 for execution by the processor 122 and data 135 which is retrieved, manipulated or stored by the processor 122. The memory 124 may be of any type capable of storing information accessible by the processor 122, such as hard-drive, ROM, RAM, CD-ROM, write-capable, read-only, or the like.

The instructions 130 may comprise an set of instructions 130 to be executed directly (such as machine code) or indirectly (such as scripts) by the processor 122. In that regard, the terms "instructions", "steps", and "programs" may be used interchangeably herein. The functions, methods, and routines of the program in accordance with the present invention are explained in more detail below.

Data 135 may be retrieved, stored, or modified by the processor 122 in accordance with the instructions 130. The data 135 may be stored as a collection of data 135. For instance, although the invention is not limited by any particular data structure, the data 135 may be stored in computer registers, in a relational database as a table having a plurality of different fields and records. The data 135 may also be formatted in any computer readable format such as, but not limited to, binary values, ASCII, or EBCDIC (Extended Binary-Coded Decimal Interchange Code), etc. Moreover, any information sufficient to identify the relevant data 135 may be stored, such as descriptive text, proprietary codes, pointers, or information which is used by a function to calculate the relevant data 135.

Although the processor 122 and memory 124 are functionally illustrated in FIG. 1 within the same block, it will be understood by those of ordinary skill in the art that the processor 122 and memory 124 may actually comprise multiple processors and memories that may or may not be stored within the same physical housing. For example, some or all of the instructions 130 and data 135 may be stored on removable CD-ROM and others within a read only memory. Some or all of the instructions 130 and data 135 may be stored in a location physically remote from, yet still accessible by, the processor 122. Similarly, the processor 122 may actually comprise a collection of processors which may or may not operate in parallel.

The client computer 110 may include components typically found in a computer system such as a display (e.g., an LCD screen), user input devices (e.g., a keyboard, mouse, touch-sensitive screen, voice recognition device), modem (e.g., telephone, cable, or wireless modem), and all of the components used for connecting these elements to one another. This computer 110 may be any device capable of processing instructions and transmitting data to and from humans and other computers, including but not limited to electronic notebooks, PDAs, and wireless phones.

The client computer 110 may communicate with the server computer 120 via any type of wired or wireless connection, such as radio frequency signals, microwave signals, or infrared signals. For example, the server computer 120 and the client computer 110 may reside in different rooms of the same building and may be wired to one another via cable. According to another example, the client computer 110 may reside in a mobile unit, such as a police response vehicle, and communicate via wireless signal with the server computer 120, which may be stationed at the local police department. Although only one client computer 110 is depicted in FIG. 1, it should be appreciated that a typical system can include a large number of connected computers. The client computers 110 may communicate with the server computer 120 and with each other via the Internet, connecting to the Internet via a modem or some other communication component such as a network card. For example, the server computer 120 may store data 135 for an entire city or state and may service every client computer 110 in that city or state.

Server computer 120 contains hardware for sending and receiving information over the Internet or World Wide Web, such as web pages or files. Server computer 120 may be a typical web server or any computer network server or other automated system capable of communicating with other computers over a network. Although the system 100 is described as including communications between client computer 110 and server computer 120 over the internet, other embodiments are not limited to any particular type of network, or any network at all.

Although certain advantages are obtained when information is transmitted or received as noted above, other aspects of the invention are not limited to any particular manner of transmission of information. For example, in some aspects, the information may be sent via EDI (electronic data interchange) or some other medium such as disk, tape, or CD-ROM. The information may also be transmitted over a global or private network, or directly between two computer systems, such as via a dial-up modem. In other aspects, the information may be transmitted in a non-electronic format and manually entered into the system.

In addition to the operations illustrated in FIG. 1, an operation in accordance with a variety of aspects of the method will now be described. It should be understood that the following operations do not have to be performed in the precise order described below. Rather, various steps can be handled in reverse order or simultaneously. Moreover, many or all of the steps may be performed automatically, or manually as needed or desired.

Figure 2:
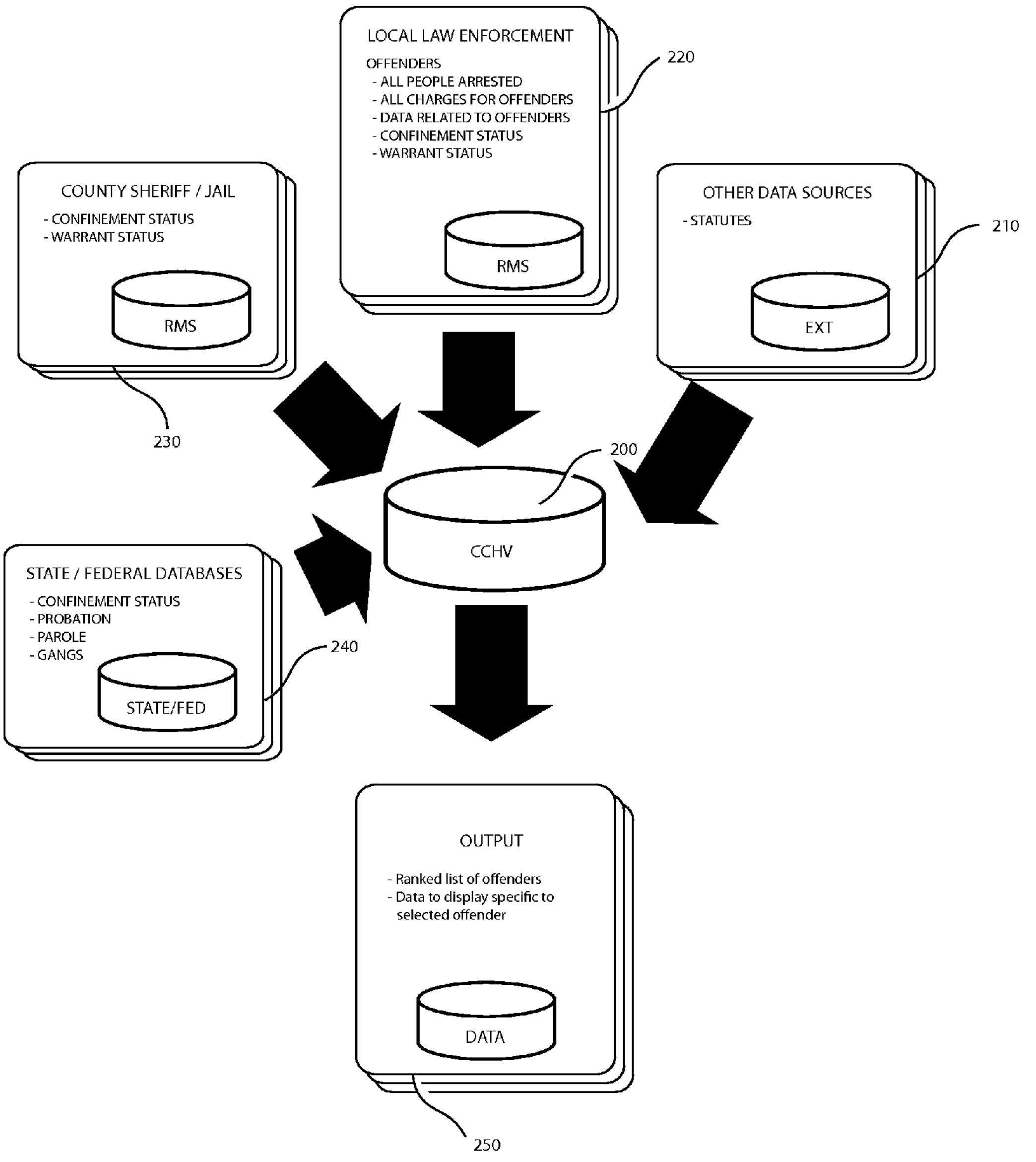
FIG. 2 is a system diagram according to another aspect of the present invention.

A method of identifying and classifying people who have been arrested for committing crimes may include assembling data relating to prior transactions. The prior transactions may be any of a number of types of confinement occurrences. For example, the transactions may be confinements or arrests initiated by the local police department, or confinements or arrests initiated by another agency. Such data may be entered directly by a user, or it may be assembled from one or more linked databases, as shown in FIG. 2. For example, the system may be linked to a database 200 maintaining records of all offenders that have ever been arrested by the local law enforcement agency, and may extract data related to one or more of those offenders. Data may also be retrieved from various emergency response, law enforcement, and government databases 210-240. Examples of such databases are state/federal databases 240, including gang, parole, and probation information, county sheriff and jail databases 230, including information regarding warrants and confinement status, and local law enforcement databases 220, including information related to specific offenders and the group classification of offenders. Other potential data sources 210 include federal, state, and local laws and statutes.

The assembled data may be organized in any way to facilitate analysis. For example, the data may be presented in a transactional format where the particular offender may be listed, and all other data related thereto listed accordingly.

A set of analysis parameters associated with details of the prior transactions may be selected. For example, analysis parameters may relate to the severity of the offense committed by any one offender, the count of offenses committed by any one offender, and the elapsed time since any one offender committed his or her last offense. Source data or any other data sources that may be relevant to the analysis can be utilized as parameters for the analysis. For example, parameters may be defined for grouping offenders into categories (e.g., Tier One Offenders, Tier Two Offenders, Tier 3 Offenders, or offenders who have committed a burglary, offenders who have committed a robbery, etc.).

Figure 5:
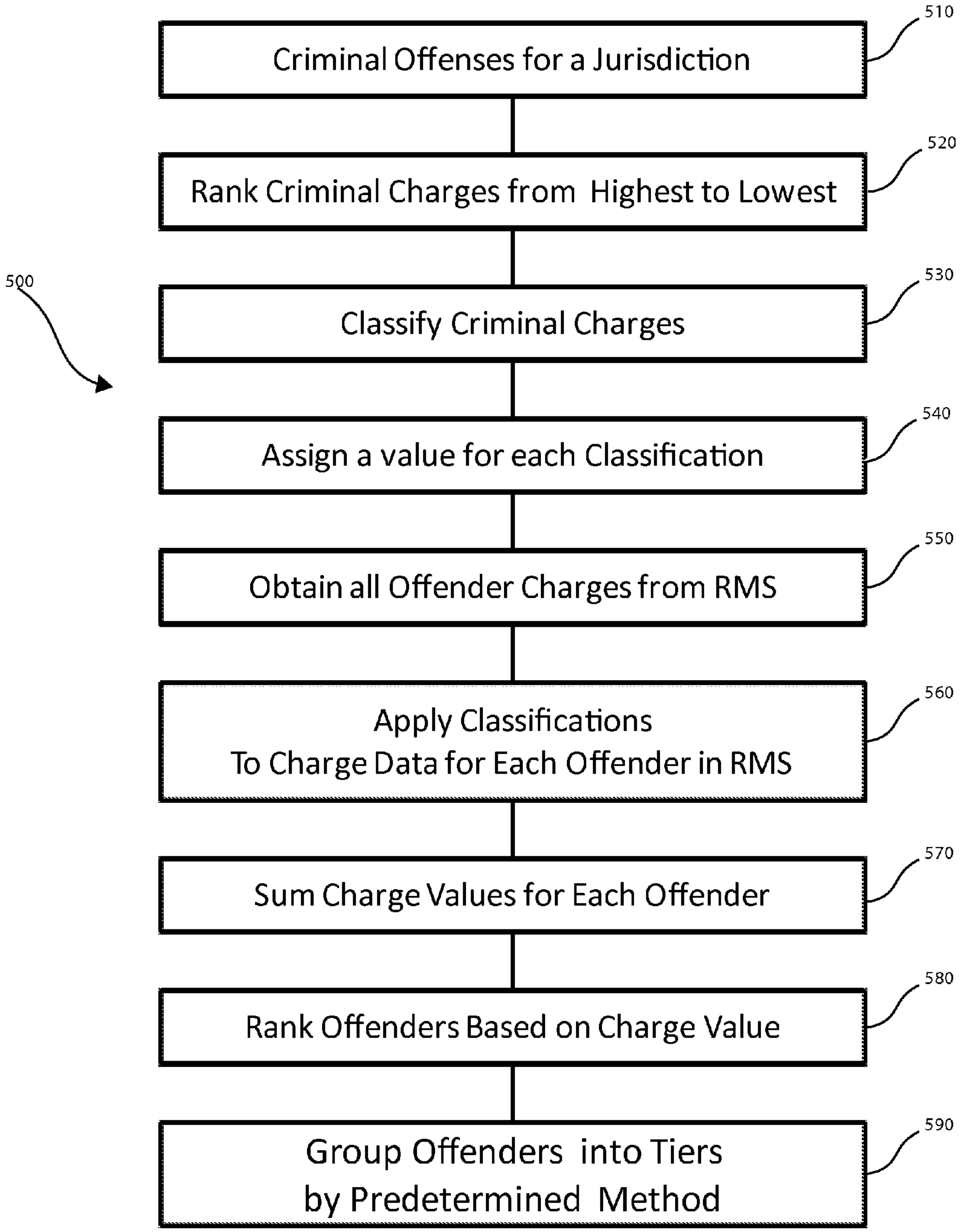
FIG. 5 is a flow chart of an example of a method to create a Career Criminal and Habitual Violator (CCHV) index or the like in accordance with an aspect of the present invention.

The Career Criminal and Habitual Violator (CCHV) Index, FIG. 5, may be created using the CCHV Index Creation Process 500. The CCHV Index consists of a prioritized directory of Criminal Offenses for a Jurisdiction 510 listed in order from most serious to least serious 520. Each offense is then grouped into a category 530. Each category is given a corresponding point value with the most serious having the highest number to the least serious getting the lowest value 540, as represented by the example:

| Offense Category | Point Value |
|---|---|
| Felony Capital | 50 |
| Felony 1 | 40 |
| Felony 2 | 30 |
| Felony 3 | 20 |
| Misdemeanor A | 15 |
| Misdemeanor B | 10 |
| Misdemeanor C | 5 |

In one embodiment, it may be important to have a large range of point values for the classification. A wide range of point values may be utilized by the inventors to fine tune a jurisdiction's priorities for certain levels of offenses. Each offender's charge data and other details are then extracted 550 from the local law enforcement database 220 and are stored in the CCHV database 200. The CCHV index continues to develop when each offender's list of arrest charges in the local law enforcement database 220 are categorized and given a value 560, as shown in FIG. 4. The offender's points from the lists of charges are added for a sum value for the offender 570. The process is completed when the total value of each offender is compared to all other offenders and ranked from highest to lowest 580. The offender with the highest total value is listed first. The remaining offenders are listed from highest total value to the least total value, as represented by the example based on FIG. 4:

| Offender ID | Points | Index |
|---|---|---|
| 2 | 60 | 1 |
| 1 | 60 | 2 |
| 4 | 15 | 3 |
| 3 | 5 | 4 |

Based on a predetermined method, offenders are classified into categories or tiers 590. Ties based on offender totals are ranked based on the most recent offense. For example, offenders may be classified into the Tier One category if they are within the top 3% of the jurisdiction's offenders based on the CCHV index, or offenders may be classified into the Burglars category if they have ever been arrested for a Burglary offense within the local jurisdiction. Thus, a series of steps may be performed by the processor 122 to create a CCHV index based on information obtained from various databases 200-240.

Figure 3:
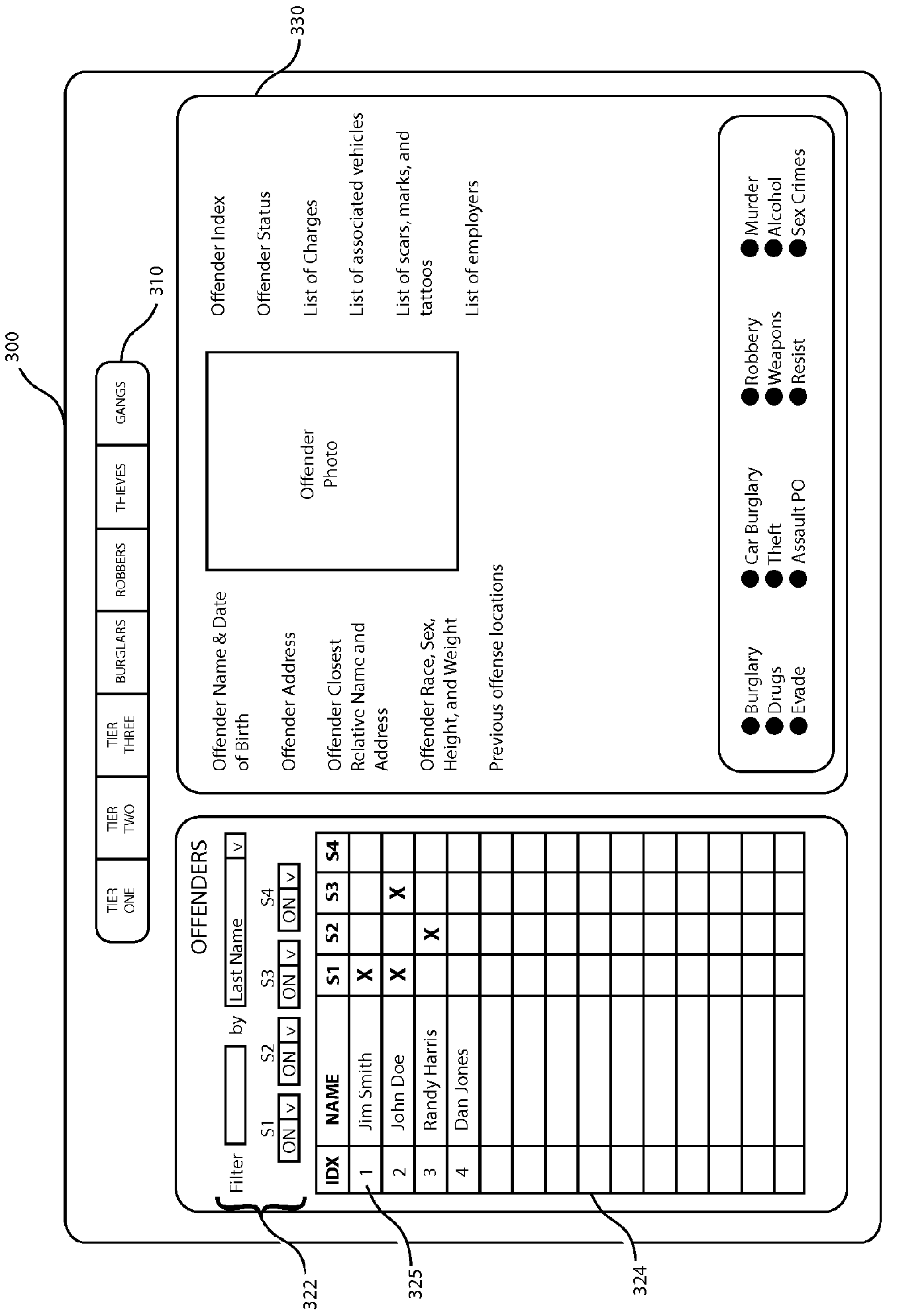
FIG. 3 is a user interface according to an aspect of the present invention.

Shown in FIG. 3 the user interface 300 allows the selection of a variable, which is associated with an offender category. For example, group selection toggle bar 310 allows the user to choose only one offender category as a variable. The processor 122 may then filter the output 250 to include only offenders in the selected group. Although only these variables are shown, it should be understood that any variable related to offender categories may be used. Offender filters 322 may allow the user to further filter the offender index list 324 to display a more specific grouping of offenders. For example, a user may use offender filters 322 to filter the offender index list 324 by partial last name, partial first name, address, moniker, or current status based on data 135.

Any number of additional attributes can be assigned to an offender by the processor 122 based on information provided by the various databases 200-240 (e.g., an offender may be assigned one or more status labels, such as "On Parole" or "In Public").

The user interface 300 allows for the selection of a offender selection variable 325, which is associated with a specific offender. The processor 122 may then return output 250 pertaining to the selected offender to the offender details 330 of the user interface 300. Details about a specific offender may include information provided by the various databases 200-240 such as date of birth, race, sex, height, weight, address, an image, or any number of other offender specific details. The user interface 300 may also allow for the selection of details in the offender details 330 for more granular review. For example, a report number may be selected allowing for the display of report details in the user interface 300, or an address may be selected allowing for a generic map to display the address in the user interface 300.

Conclusions, Ramifications, And Scope

The Career Criminal and Habitual Violator (CCHV) Intelligence Tool is an effective way to determine which high-rate offenders are responsible for the majority of crime in a jurisdiction. Current criminal justice database search tools require a detective or officer to request data one offender at a time. With no perspective on the relative dangerousness of one offender compared to another, current search tools are inadequate.

New and veteran officers can greatly increase their safety with immediate access to warnings provided in the CCHV Intelligence Tool's offender display. Though veteran street officers know a lot of repeat offenders, no one can recollect all of the top tier criminals at a moment's notice without the CCHV Intelligence Tool. The CCHV Intelligence Tool can be scaled to meet the needs of county, regional or state level jurisdictions.

Our computer software and web application enables officers, detectives, and supervisors to research the offenders in their jurisdiction. They can intentionally track and monitor the status of the offenders that are not currently incarcerated. They can deliberately increase lawful contacts with these high-rate and treacherous offenders. The CCHV Intelligence Tool does not allow filtering by race to inhibit racial profiling. Since the offenders have a wealth of criminal knowledge, they could become informants for law enforcement. Known associates, neighbors, and co-workers of the offenders could provide valuable information on the criminal activities of these offenders. Increasing contact with offenders and developing informants can lead to an increase in detecting additional criminal activities by these offenders. Newly detected criminal offenses can lead to additional arrests and charges on the listed criminals. Coordination with the prosecuting authorities can lead to more selective incarceration and, eventually, fewer crimes committed by these offenders due to their incarceration.

What is claimed is:

1. A computer-implemented method for ranking and grouping criminal offenders comprising:

a. receiving information about types of criminal offenses for a jurisdiction from a database;

b. ranking the types of criminal offenses based on predetermined criteria;

c. grouping the ranked types of criminal offenses into categories;

d. assigning a value to each of the criminal offense categories based on predetermined criteria;

e. obtaining individual criminal offender charge data from a database;

f. applying, for each category of offense committed by a criminal offender, the assigned criminal offense category value to an individual criminal offender's charge data for each charge to create an offender-offense value;

g. summing each offender-offense value for each criminal offender;

h. ranking criminal offenders based on the summed offender-offense values;

i. creating groups of the ranked criminal offenders based on predetermined criteria; and j. displaying the ranked and grouped criminal offenders.

* * * * *